UNITED STATES PATENT OFFICE 2,298,733

FILTER DYE AND PHOTOGRAPHIC MATERIAL CONTAINING THE SAME

Leslie G. S. Brooker and Robert H. Sprague, Rochester, N. Y., assignors to Eastman Kodak Company, Rochester, N. Y., a corporation of New Jersey No Drawing. Application March 29, 1941, Serial No. 385,938

14 Claims. (Cl. 95—8)

This invention relates to filter dyes and to a photographic material containing the same.

A number of dyes have been proposed for the preparation of filter layers in photographic elements. However, but a relatively few of these dyes are completely satisfactory, because the dyes are not completely and permanently bleached during the developing process. In many cases, there remains a more or less strong coloration, or the coloration reappears, or is strengthened during the subsequent drying.

Examples of dyes which do not bleach completely during the developing process are those which can be represented by the following general formulas:

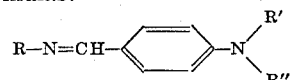

and

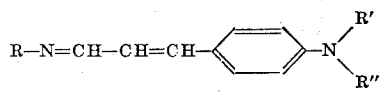

wherein R represents any monovalent organic group, and R' and R'' represent alkyl groups.

We have now found that dyes which may be regarded as quaternary salts of the dyes of the second general formula can be made and that such dyes bleach readily in photographic developing processes. It is, accordingly, an object of our invention to provide new dyes and a process for preparing them. A further object is to provide photographic materials provided with a filter comprising such new dyes. Other objects will become apparent hereinafter.

In accordance with our invention, we prepare our new dyes by condensing a dialkylaminocinnamic aldehyde with the salt of a secondary amine. The condensations are advantageously effected in a solvent, such as methyl, ethyl or isopropyl alcohol. As salts of secondary amines, the hydrochlorides are advantageously employed. The resulting condensation products are frequently quite soluble, and hence are advantageously converted to their iodides or perchlorates to facilitate isolation and purification. Heat accelerates the condensations. The following examples will serve to illustrate the formation of our new dyes.

EXAMPLE 1. *N-(p-dimethylaminocinnamylidene) methyl phenylammonium iodide*

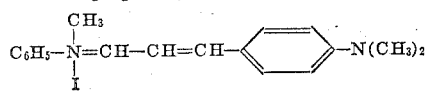

1.44 g. (1 mol.) of methylaniline hydrochloride and 1.75 g. (1 mol.) of p-dimethylaminocinnamaldehyde were placed in 15 cc. of absolute ethyl alcohol. The mixture was boiled, under reflux, for 5 minutes. The mixture became red in color. A solution of 1.5 g. (1 mol.) of sodium iodide dissolved in 10 cc. of methyl alcohol was added to the mixture, and the whole was chilled to 0° C. The crystals of dye which separated were filtered off, washed with acetone, and with water, and dried in the air. Yield 80%. After recrystallization from absolute ethyl alcohol (42 cc. per gram of dye), the dye was obtained in 62% yield, as blue needles melting at 190° to 191° C. with decomposition. The dye gave a pink solution in methyl alcohol. The dye was bleached by Eastman Kodak Company's "D–76" developer. The dye has a very weak sensitizing action on photographic gelatino - silver - bromiodide emulsions from about 460 mu. to 540 mu. with a maximum at 510 mu.

EXAMPLE 2.—*1-(p-dimethylaminocinnamylidene) piperidinium perchlorate*

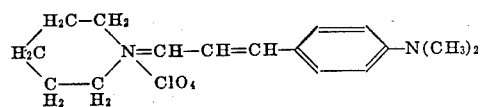

0.85 g. (1 mol.) of piperidine, 1.75 g. (1 mol.) of p-dimethylaminocinnamaldehyde and 1.1 g. (1 mol.) of 35% hydrochloric acid were placed in 15 cc. of absolute ethyl alcohol. The mixture was boiled, under reflux, for 5 minutes. A solution of 1.23 g. (1 mol.) of sodium perchlorate in 10 cc. of hot methyl alcohol was added to the mixture. The mixture was chilled and the dye which precipitated was filtered off and recrystallized from absolute ethyl alcohol (155 cc. per gram of dye). It was obtained, in 26% yield, as dark red needles having a steel blue reflex and melting with decomposition at 209° to 210° C. It gave a yellow solution in methyl alcohol and was bleached by Eastman Kodak Company's "D–76" developer. It exhibited a very weak sensitizing action on a photographic gelatino-silver-bromiodide emulsion from 460 to 540 mu., with a maximum at 510 mu.

EXAMPLE 3.—*1-(p-dimethylaminocinnamylidene)-1, 2, 3, 4-tetrahydroquinolinium iodide*

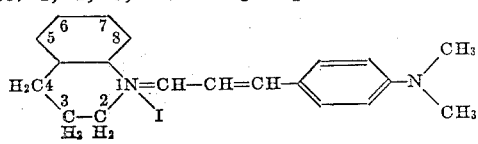

1.33 g. (1 mol.) of 1, 2, 3, 4-tetrahydroquinoline, 1.75 g. (1 mol.) of p-dimethylaminocinnamaldehyde and 1.1 g. (1 mol.) of 35% hydrochloric acid were placed in 15 cc. of absolute ethyl alcohol. The mixture was boiled, under reflux, for 5 minutes. A solution of 1.5 g. (1 mol.) of sodium iodide in 10 cc. of methyl alcohol was added and the mixture chilled to 0° C. The dye which separated was filtered off. After recrystallization from methyl alcohol (68 cc. per gram of dye), the dye was obtained, in 67% yield, as blue needles melting with decomposition at 210° to 211° C. The dye gave a red solution in methyl alcohol. The dye was bleached by Eastman Kodak Company's "D-76" developer. The dye sensitized a photographic gelatino-silver-bromiodide emulsion very weakly from 460 to 540 mu. with a maximum at 510 mu.

EXAMPLE 4.—*N-(p-dimethylaminocinnamylidene)-N,N-diphenylammonium perchlorate*

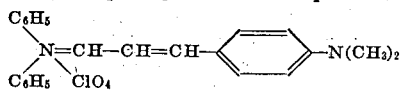

1.7 g. (1 mol.) of diphenylamine, 1.75 g. (1 mol.) of p-dimethylaminocinnamaldehyde and 1.1 g. (1 mol.) of 35% hydrochloric acid were placed in 15 cc. of absolute ethyl alcohol. The mixture was shaken for 10 minutes at 20° to 25° C. To the resulting purple solution was added 1.23 g. (1 mol.) of sodium perchlorate dissolved in 10 cc. methyl alcohol. The mixture was chilled with stirring. The crystals of dye which separated were filtered off, washed with acetone and with water and dried in the air. After recrystallization from methyl alcohol (43 cc. per gram of dye), the dye was obtained, in 54% yield, as minute blue-green crystals melting with decomposition at 195° to 197° C. The dye gave a pink solution in methyl alcohol. The dye was bleached by Eastman Kodak Company's "D-76" developer. The dye sensitized a photographic gelatino-silver-bromiodide emulsion very weakly from 300 to about 540 with no definite maximum.

EXAMPLE 5.—*N-(p-dimethylaminocinnamylidene)-N,N-di-(β-naphthyl)-ammonium iodide*

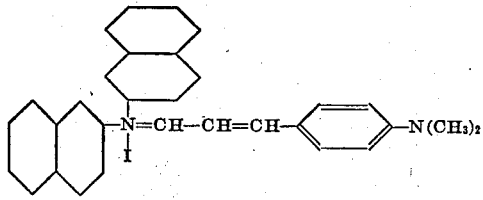

2.7 g. (1 mol.) of di-β-naphthylamine, 1.75 g. (1 mol.) of p-dimethylaminocinnamaldehyde and 1.1 g. (1 mol.) of 35% hydrochloric acid were placed in 15 cc. of absolute ethyl alcohol. The mixture was shaken at 20° to 25° C. for 10 minutes. The mixture was then treated with 1.23 g. (1 mol.) of sodium perchlorate dissolved in 10 cc. of methyl alcohol. The mixture was chilled with stirring. The dye which separated was filtered off, washed with acetone and with water, and then dried in the air. The dye was recrystallized from methyl alcohol (100 cc. per gram of dye) and obtained, in 35% yield, as green crystals melting with decomposition at 158° to 160° C. The dye gave a bluish red solution in methyl alcohol. The dye was bleached by Eastman Kodak Company's "D-76" developer. The dye had no sensitizing action on a photographic silver halide emulsion.

EXAMPLE 6.—*N,N-dibenzyl-N-(p-dimethylaminocinnamylidene)-ammonium iodide*

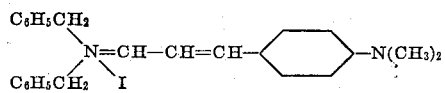

2.0 g. (1 mol.) of dibenzylamine, 1.75 g. (1 mol.) of p-dimethylaminocinnamaldehyde and 1.1 g. (1 mol.) of 35% hydrochloric acid were placed in 15 cc. of absolute ethyl alcohol. The mixture was shaken at 20° to 25° C. for 10 minutes. To the resulting mixture were added 1.23 g. (1 mol.) of sodium perchlorate dissolved in hot methyl alcohol. The resulting mixture was chilled with stirring. The crystals of dye which separated were filtered off, washed with acetone and with water, and finally dried in the air. After recrystallization from absolute ethyl alcohol (24 cc. per gram of dye), the dye was obtained, in 54% yield, as blue needles, melting with decomposition at 199° to 200° C. The dye gave a pinkish orange solution in methyl alcohol. The dye was bleached by Eastman Kodak Company's "D-76" developer. The dye sensitized a photographic gelatino-silver-bromiodide emulsion very weakly to 540 mu.

EXAMPLE 7.—*N-benzyl-N-(p-dimethylaminocinnamylidene)-N-phenyl-ammonium iodide*

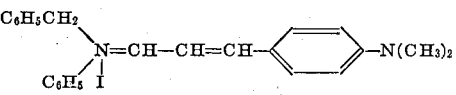

1.73 g. (1 mol.) of N-benzylaniline, 1.75 g. (1 mol.) of p-dimethylaminocinnamaldehyde and 1.1 g. (1 mol.) of 35% hydrochloric acid were placed in 15 cc. of absolute ethyl alcohol. The mixture was shaken at 20° to 25° C. for 10 minutes. To the resulting mixture were added 1.23 g. (1 mol.) of sodium perchlorate dissolved in 10 cc. of hot methyl alcohol. The resulting mixture was then chilled with stirring. The crystals of dye which separated out were filtered off, washed with acetone and with water and dried in the air. The dye was recrystallized from absolute ethyl alcohol (32 cc. per g. of dye) and obtained, in 66% yield, as blue crystals, melting with decomposition at 191° to 193° C. The dye gave a bluish red solution in methyl alcohol. It was bleached by Eastman Kodak Company's "D-76" developer. It sensitized a photographic gelatino-silver-bromiodide emulsion very weakly out to about 530 mu.

EXAMPLE 8.—*N-(p-dimethylaminocinnamylidene) morpholinium perchlorate*

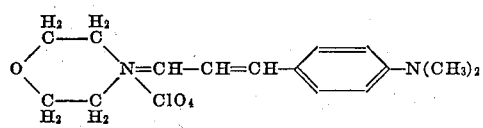

0.87 g. (1 mol.) of morpholine, 1.75 g. (1 mol.) of p-dimethylaminocinnamaldehyde and 1.1 g. (1 mol.) of 35% hydrochloric acid were placed in 15 cc. of absolute ethyl alcohol. The mixture was shaken at 20° to 25° C. for 10 minutes. To the resulting mixture were added 1.23 g. (1 mol.) of sodium perchlorate dissolved in 10 cc. of hot methyl alcohol. The resulting mixture was then chilled, with stirring. The crystals of dye which separated out were filtered off, washed with acetone and with water and dried in the air. The dye was recrystallized from absolute ethyl alcohol (130 cc. per g. of dye) and obtained, in 60% yield, as minute green crystals, melting with decomposition at 192° to 194° C. The dye gave a yellow solution in methyl alcohol. The dye was bleached by Eastman Kodak's "D-76" developer. It sensitized a photographic gelatino-silver-bromiodide emulsion very weakly out to 520 mu.

EXAMPLE 9.—1,4-bis(p-dimethylaminocinnamylidene) piperazinium dichloride

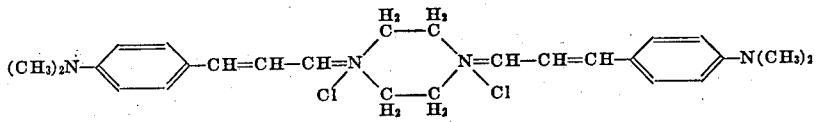

1.94 g. (1 mol.) of piperazine hexahydrate, 3.5 g. (2 mol.) of p-dimethylaminocinnamaldehyde and 2.2 g. (2 mol.) of 35% hydrochloric acid were placed in 25 cc. of absolute ethyl alcohol. The mixture was boiled, under reflux, for 5 minutes. The dye separated at once from the hot mixture. The mixture was chilled, the dye filtered off, the dye washed with acetone, with water and dried in the air. After recrystallization from absolute ethyl alcohol (14 cc. per g. of dye), the dye was obtained as blue crystals melting with decomposition at 284° to 287° C. Yield 76%. The dye gave a pinkish orange solution in methyl alcohol. The dye was bleached by Eastman Kodak's "D-76" developer. The dye sensitized a photographic gelatino-silver-bromiodide emulsion very weakly out to 580 mu.

EXAMPLE 10.—p-Phenylene-N, N-bis(p-dimethylaminocinnamylidene) - N,N'-dimethyldiammonium-oxalate

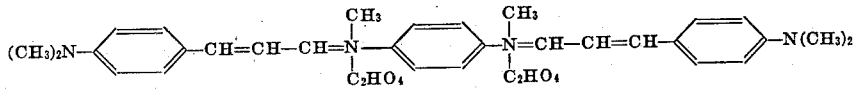

3.5 g. (2 mol.) of p-dimethylaminocinnamic aldehyde and 3.7 g. (1 mol.) of N,N'-dimethyl-p-phenylenediamine dioxalate were placed in 25 cc. of absolute ethyl alcohol. The mixture was boiled, under reflux, for 5 minutes. The dye separated from the hot mixture. The mixture was chilled, the dye filtered off, the dye washed with acetone, with water and dried in the air. After recrystallization from methyl alcohol (130 cc. per g. of dye), the dye was obtained as dull blue crystals melting at 206° to 210° C. Yield 61%. The dye gave a bluish red solution in methyl alcohol. The dye was bleached by Eastman Kodak's "D-76" developer. The dye sensitized a photographic gelatino-silver-bromiodide emulsion very weakly with considerable desensitization in the blue region.

Our new dyes are especially useful in the preparation of photographic materials comprising an antihalation layer. Thus, a support of glass, cellulose derivative film or resin film, coated on one side with a gelatino-silver-halide emulsion may be coated on the other side with a layer of gelatin, gum arabic, casein, calcium salt of polyglycuronic acid or other suitable colloid in which one or more of our new dyes is dispersed. A support may also be coated with a filter layer of a suitable colloid in which one or more of our new dyes is dispersed, and a gelatino-silver-halide emulsion layer may be coated over such a filter layer. A silver halide emulsion layer may also be overcoated with a filter layer of a suitable colloid in which one or more of our new dyes is dispersed. The following procedure is satisfactory for preparing a dispersion of our new dyes for coating as a filter layer: 75 grams of gelatin were dissolved in 1000 cc. of water and 3 to 4 grams of one or more of our new dyes dissolved in 100 cc. of methyl alcohol, were added to the gelatin solution. The resulting solution may be used to coat on the support or on the emulsion.

Our new dyes can be represented by the following general formulas:

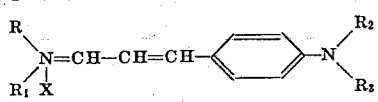

and

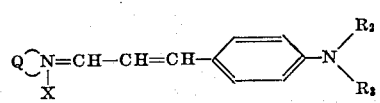

wherein R and $R_1$ each represents a monovalent organic radical, Q represents a divalent organic radical, $R_2$ and $R_3$ each represent an alkyl radical and X represents an acid radical.

What we claim as our invention and desire to be secured by Letters Patent of the United States is:

1. A photographic material provided with a silver halide emulsion layer and a filter comprising a dye of the following general formula:

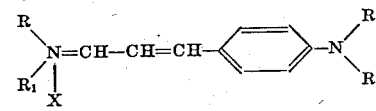

wherein R and $R_1$ each represent a monovalent organic radical, $R_2$ and $R_3$ each represent alkyl radicals and X represents an acid radical.

2. A photographic material provided with a silver halide emulsion layer and a filter comprising a dye of the following general formula:

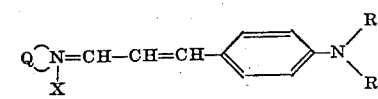

wherein Q represents a divalent organic radical, $R_2$ and $R_3$ each represent alkyl radicals and X represents an acid radical.

3. A photographic material provided with a gelatino silver halide emulsion layer and a filter comprising a dye of the following general formula:

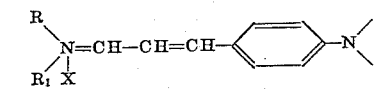

wherein R and $R_1$ each represent a monovalent organic radical, $R_2$ and $R_3$ each represent alkyl radicals and X represents an acid radical.

4. A photographic material provided with a silver halide emulsion layer and a filter comprising a dye of the following general formula:

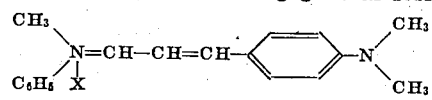

wherein X represents an acid radical.

5. A photographic material provided with a silver halide emulsion layer and a filter comprising a dye of the following general formula:

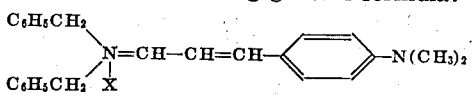

wherein X represents an acid radical.

6. A photographic material provided with a silver halide emulsion layer and an antihalation layer comprising a dye of the following general formula:

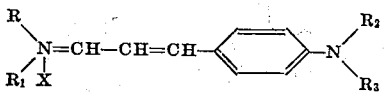

wherein R and $R_1$ each represent a monovalent organic radical, $R_2$ and $R_3$ each represent alkyl radicals and X represents an acid radical.

7. A photographic material provided with a silver halide emulsion layer and an antihalation layer comprising a dye of the following general formula:

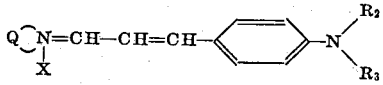

wherein Q represents a divalent organic radical, $R_2$ and $R_3$ each represent alkyl radicals and X represents an acid radical.

8. A photographic material provided with a silver halide emulsion layer and an antihalation layer comprising a dye of the following general formula:

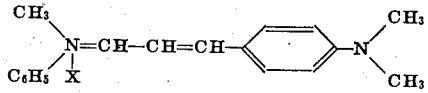

wherein X represents an acid radical.

9. A photographic material provided with a silver halide emulsion layer and an antihalation layer comprising a dye of the following general formula:

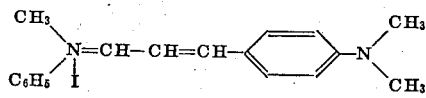

10. A photographic material provided with a silver halide emulsion layer and an antihalation layer comprising a dye of the following general formula:

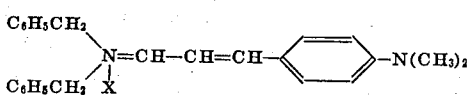

wherein X represents an acid radical.

11. A photographic material provided with a silver halide emulsion layer and an antihalation layer comprising a dye of the following formula:

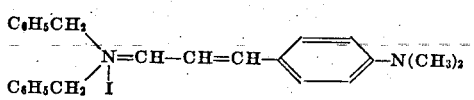

12. A photographic material provided with a silver halide emulsion layer and an antihalation layer comprising a dye of the following general formula:

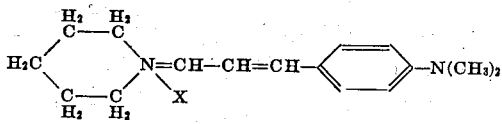

wherein X represents an acid radical.

13. A photographic material provided with a silver halide emulsion layer and an antihalation layer comprising a dye of the following formula:

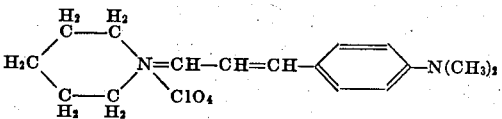

14. A photographic material provided with a silver halide emulsion layer and a filter comprising a dye of the following general formula:

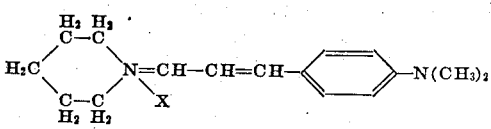

wherein X represents an acid radical.

LESLIE G. S. BROOKER.
ROBERT H. SPRAGUE.